April 18, 1967     A. S. VOLPIN     3,314,441
AUTOMATIC PLASTIC-SEALED VALVE HAVING GROOVE CLEANING MEANS
Filed Jan. 6, 1964     3 Sheets-Sheet 1

Alexander S. Volpin
INVENTOR.

BY

ATTORNEY

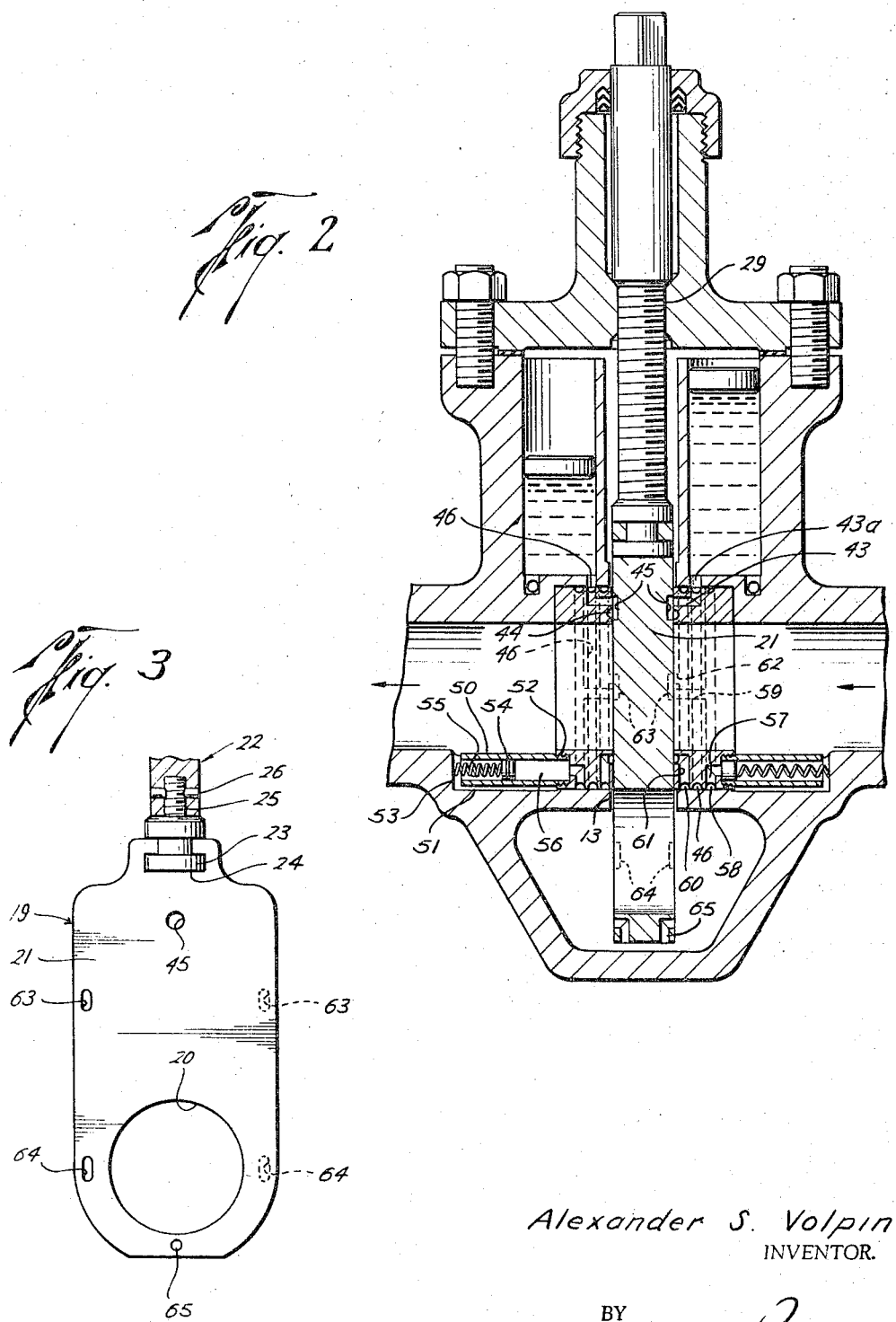

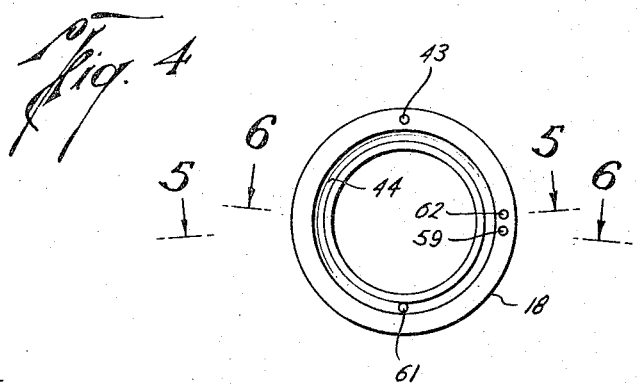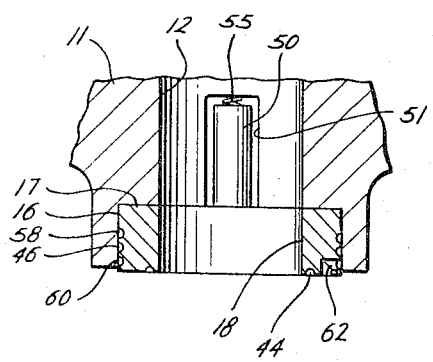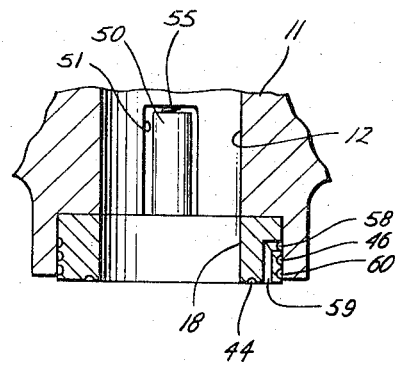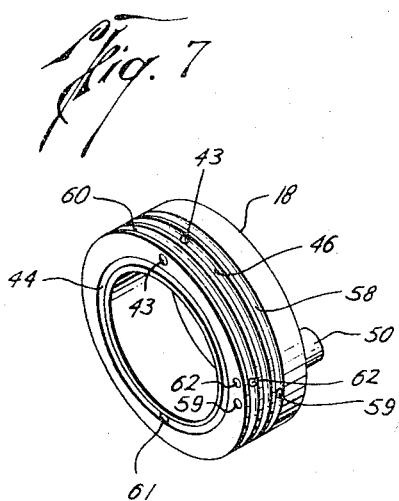
Alexander S. Volpin
INVENTOR.
BY
ATTORNEY United States Patent Office 3,314,441
Patented Apr. 18, 1967

3,314,441
AUTOMATIC PLASTIC-SEALED VALVE HAVING GROOVE CLEANING MEANS
Alexander S. Volpin, 10200 W. Broadview Drive, Miami Beach, Fla. 33139
Filed Jan. 6, 1964, Ser. No. 335,774
8 Claims. (Cl. 137—246.12)

This invention is a continuation-in-part of my copending application Ser. No. 255,358, filed Jan. 31, 1963.

This invention relates to improvements in automatic plastic-sealed valves.

In automatic plastic-sealed valves, flowable or plastic sealant material is forced automatically from storage reservoirs into sealing groove systems disposed about the flowway between the closure member and the valve seats. In most such valves, the sealing is effected on the downstream side of the valve. The actuating force on the sealant is the differential fluid pressure developed across the closure member when it is moved to the flowway-closing position.

In such valves, as the closure member moves from the flowway-opening position to the flowway-closing position, the sealing groove system will be exposed to line fluid which will be trapped in at least part of the groove system when the closure moves to the fully closed position. As a result, something less than the full sealing area about the flowway can be filled with sealant and the resulting seal may be rendered ineffective by leakage between the sealing surfaces. Under high pressures, such as are normally employed in long distance oil and gas transmission lines, this leakage may take the form of very high velocity jets which will rapidly cut-out the sealing surfaces. This situation may be further aggravated by the accumulation of line scale and other detritus in the sealing grooves while the valve is in the open position. Thus, it becomes very important to provide an arrangement which will operate promptly upon attainment of the terminal closing position of the closure member, to very quickly and efficiently clean the sealing grooves of non-sealant material while rapidly filling the sealing grooves throughout their lengths with sealant.

Accordingly, it is a primary object of this invention to provide an improved arrangement for automatic plastic-sealed valves by which any trapped line fluid or accumulated foreign matter will be automatically vented or displaced from the sealing groove in response to the differential pressure which is employed to inject sealant into the groove.

An important object is the provision of traps or vent chambers in the valve housing communicating with the sealant grooves and into which the line fluid or foreign matter will be automatically displaced by the entering sealant when the closure member moves to the closed position, and from which the line fluid or foreign matter will thereafter be expelled when the closure member is moved to the open position, so as to automatically restore the trap to a condition for receiving further discharge of the foreign matter upon the next closing of the valve.

A more specific object of this invention is to provide in a plastic-sealed valve, a trap or vent chamber fitted with a slidable barrier piston, said chamber having communication with the sealing groove to be operable, when the closure member moves to the closed position to receive the foreign matter from the groove, the chamber having means communicating with the interior of the valve housing or the flowway to automatically discharge the accumulated foreign matter upon equalization of pressure across the trap barrier piston resulting from the opening of the closure member.

Still another object is the provision in a valve of the general character described of an exhaust trap or chamber communicating at one point with the sealing groove system and at another point with the flowway through the valve, and having a barrier piston slidable in the chamber between these points, and means resiliently urging the piston toward the point in the chamber having communication with the sealing groove system.

The present invention, while employing the same general principles as the aforementioned copending application, in providing means for automatically venting or displacing trapped line fluid and accumulated foreign matter from the sealing grooves, has for its further objects the provision of different forms of means for accomplishing the primary purposes of the invention.

A more particular object is to provide an arrangement operable to prevent the pre-entry of line fluid or foreign matter present in the sealing grooves into the trap chamber until the closure member has moved to its terminal fully-closed position.

Other and more specific objects and advantages of this invention will become more readily apparent from the following detailed description when read in conjunction with the accompanying drawing which illustrates a useful embodiment in accordance with this invention.

In the drawing:

FIG. 2 is a view similar to FIG. 1, showing the closure member in the flowway-closing position;

FIG. 3 is an elevational view of one side of the closure member including a fragmentary, partly sectional view of the operating stem;

FIG. 4 is an elevational view of the inner end face of one of the gate seats;

FIG. 5 is a cross-sectional view taken generally along line 5—5 of FIG. 4;

FIG. 6 is a cross-sectional view taken generally along line 6—6 of FIG. 4; and

FIG. 7 is a perspective view of one of the gate seats.

Figure 1:
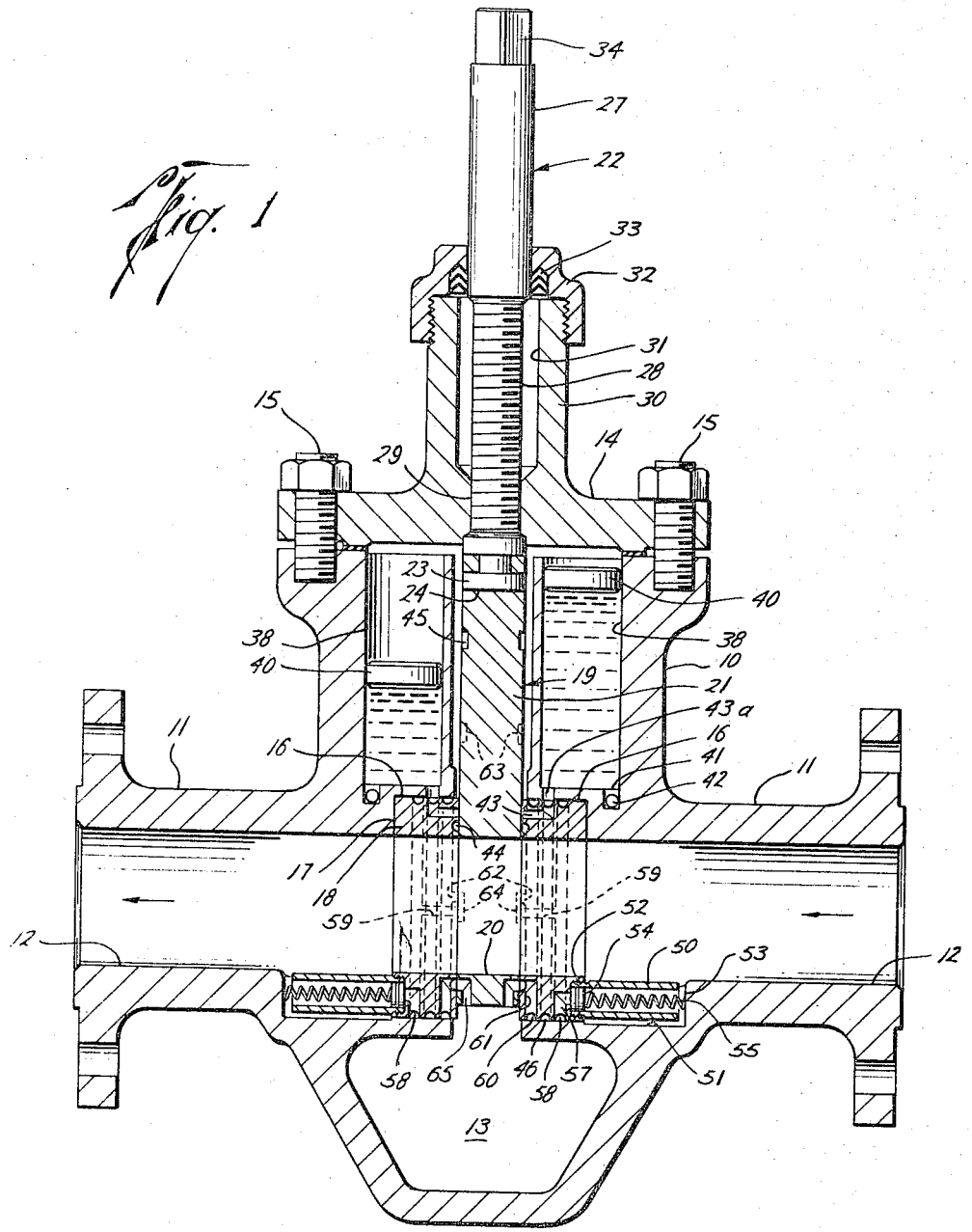
FIG. 1 is a longitudinal vertical cross-section view of a gate valve embodiment in accordance with this invention, the closure member being shown in the flowway-opening position.

Referring to the drawing, the valve, in the embodiment illustrated, is of the through-conduit, rising stem gate type and comprises a housing 10 having coaxial opposed flow nozzles 11—11 defining the flowway 12 which is intersected interiorly of the housing by the gate chamber 13. The upper end of chamber 13 is closed by means of a bonnet 14 which is removably secured to the upper end of housing 10 by means of the studs 15. The inner ends of flow nozzles 11 have annular recesses 16 defined by the bottom walls 17 surrounding the flowway. Annular gate seats 18 are removably seated in recesses 16.

A gate, designated generally by the numeral 19, is disposed in chamber 13 for vertical reciprocation across flowway 12 between gate seats 18—18. Gate 19, in the illustrative embodiment, is of one piece, generally rectangular, flat-sided construction, the side faces being slidably engageable with the opposed outer end faces of seats 18—18. The gate is provided near its lower end with a transverse opening 20 adapted to register with flowway 12 when the gate is in the raised or flowway-opening position, as seen in FIG. 1. The upper portion of the gate forms the closure section 21 which is adapted to cut off flow through flowway 12 when the gate is in the lower or flowway-closing position, as seen in FIG. 2.

Gate 19 is reciprocated by means of a stem, designated generally by the numeral 22, which is secured to the upper end of the gate by means of an inverted T-shaped head 23 slidably received in a correspondingly shaped slot 24 provided centrally in the upper end of gate 19. Head 23 is threadedly secured to the lower end of stem 22 by means of a threaded pin 25 (FIG. 3), the latter being locked to the stem by means of a cross-pin 26 which extends through suitable registering openings in pin 25 and stem 22. Stem 22 has an upper, generally smooth cylindrical portion 27 and a lower threaded portion 28. The latter is threadedly received through a threaded opening 29 in bonnet 14, whereby as the stem is rotated, engagement of the threads on section 28 in the threads in opening 29 will reciprocate the gate, depending upon the direction of rotation. Bonnet 14 has an upwardly extending neck 30 which forms a stuffing box 31 about the stem and is closed at its upper end by means of a tubular cap 32 which surrounds the cylindrical portion 27 of the stem, and is threadedly secured to the upper end of neck 30. Packing 33 is disposed in cap 32 about portion 27 of the stem to seal the upper end of the stuffing box. The upper end of stem 22 is provided with a portion 34 of polygonal shape for attachment of a conventional operator, such as a handwheel or the like.

Housing 10 has formed therein a pair of sealant reservoirs 38—38 vertically disposed on opposite sides of gate 19. Reservoirs 38 form parts of automatic plastic sealing systems for sealing between seats 18 and the adjacent sides of the gate. These sealing systems are identical and are generally symmetrically arranged with respect to the gate, the dual systems being provided so that either end of the valve may function as the upstream or downstream end, depending upon the orientation of the valve in the pipe into which it is connected. For purposes of this description, since both sealing systems are identical, the sealing system for one side of the valve will be described in detail, it being understood that the description will thus apply to both sealing systems.

The upper end of reservoir 38 is open to the interior of gate chamber 13 so as to be exposed to the line pressure which will enter the gate chamber from the upstream side of the valve. A sealant barrier 40 is slidably disposed in reservoir 38 and a channel 41 is provided through the wall of housing 10 communicating with the lower end of reservoir 38. Channel 41 is also in communication with a passage 42 leading to the exterior of the housing through which flowable or plastic sealant may be injected into reservoir 38 from the exterior of the housing by means of a conventional pressure fitting (not shown).

Seat 18 is provided with a passage 43 communicating at one end through a passage 43a with the interior of reservoir 38 below barrier 40 and at the other end with the outer end face of the seat which is engageable by the gate face. The outer end face of seat 18 is provided with an annular sealing groove 44 which is spaced a short distance radially inwardly from the outer end of passage 43 and is continuous about flowway 12. In the flowway-opening position of the gate 19 (FIG. 1) communication between passage 43 and groove 44 will be cut off by the intervening portion of seat 18. However, in the full flowway-closing position of the gate (FIG. 2) the latter is provided with a circular bridging recess 45 which is adapted to span the portion of the inner end face of seat 18 which intervenes between the end of passage 43 and sealing groove 44, as seen in FIG. 2.

Passage 43 communicates with a first groove 46 encircling the periphery of seat 18 substantially mid-way between the ends of the seat. Groove 46 is in registration with passage 43a so htat sealant flowing from reservoir 38 will enter groove 46 at the same time as it enters passage 43.

Dual vent or trap systems are provided for both sealing groove systems and as they are identical in structure, only one will be described in detail.

Each trap system comprises a tubular sleeve 50 projecting rearwardly from the back face of seat 18 at a point beneath flowway 12. The bottom of flow nozzle 11 will be provided with a generally semi-cylindrical depression or trough 51 slightly longer than sleeve 50 and of sufficient depth to fully receive the latter. Seat 18 is provided with an internally threaded socket 52 for threadedly receiving one end of sleeve 50 while the opposite end of sleeve 50, which will be spaced from the adjacent end wall 53 of trough 51, will be open and in open communication with flowway 12 through the clearance space between the rearward end of sleeve 50 and end wall 53. A sealed barrier piston 54 is slidably disposed in the bore of sleeve 50 and is biased inwardly toward the inner end of the sleeve by resilient means such as the coil spring 55 which is mounted in compression between piston barrier 54 and end wall 53 of trough 51.

The space provided between barrier piston 54 and the bottom of socket 52 defines an expansible chamber 56 (FIG. 2), herein termed a vent or trap chamber, which communicates with a passage 57 extending through the body of seat 18 from the bottom of socket 52 to a second groove 58 encircling the periphery of seat 18 generally parallel to groove 46 and inwardly thereof. Groove 58 communicates with a passage 59 which extends longitudinally through the body of seat 18 to its outer end face at a point angularly spaced from passage 43 (FIGS. 4 and 6).

A third groove 60, generally parallel to grooves 46 and 58, encircles the periphery of seat 18 between groove 46 and the outer end of the seat. A duct 61 extends through the lower portion of seat 18 and communicates groove 60 with the lower portion of sealing groove 44. A short passage 62 extends longitudinally of the body of seat 18 from groove 60 and opens to the outer end face of seat 18 at a point angularly spaced a short distance from the end of passage 59, as best seen in FIG. 4. In order to communicate passages 59 and 62 with each other, as is required in operation of the valve, the faces of gate 19 are provided with longitudinally spaced upper and lower bridging recesses 63 and 64, respectively, located adjacent the side edges of the gate in alignment with the ends of passages 59 and 62. Upper recess 63 is located so as to bridge the ends of passages 59 and 62 when the gate is in the full or terminal flowway-closing position (FIG. 2) and lower recess is located so as to bridge the ends of the passageways when the gate is in the full or terminal flowway-opening position (FIG. 1).

Gate 19 is provided centrally of its lower end with a pair of vent passages 65, each of which opens at one end to a side face of the gate at a point adapted to register with the end of passage 61 in the related seat face when the gate is in the upper or full flowway-opening position (FIG. 1). The other end of each vent passage 65 opens to the lower end of the gate into communication with the bottom of gate chamber 13.

In operation, it will be assumed for purposes of this description that fluid flow through flowway 12 is in the direction indicated by the arrow in FIG. 1, the right-hand side of the valve, therefore, being the upstream side and the left-hand side of the valve being the downstream side. With the valve in the open position, illustrated in FIG. 1, all pressures will, of course, be balanced and trap pistons 54 in each of the trap sleeves 50 will be in the innermost positions, as illustrated in FIG. 1, under the pressure of springs 55. Also, in the open position of the gate, it will be evident that grooves 44 will be exposed to the line fluid and will be filled therewith, as well as with any line scale or other detritus which tends to accumulate in such grooves when the valve is in the open position and line fluid is flowing therethrough.

As the gate is moved to the flowway-closing position, illustrated in FIG. 2, line fluid and foreign matter in the downstream groove particularly will be trapped in the groove as closure section 21 of the gate moves across the groove. When the gate has attained the terminal fully closed position, a differential pressure will, of course, be immediately developed across the gate. The pressure of the line fluid will be exerted on the upstream side of the gate tending to urge it toward the downstream seat. The line pressure will, of course, leak past the upstream face of the gate into the gate chamber and will act on the upper end of the barrier 40 in the downstream sealant reservoir and will urge the barrier downwardly, forcing sealant through passages 43a and 43 and thence via bridging recess 45 into the downstream groove 44. As the pressure differential will normally be sufficient to overcome the frictional resistance to the movement of the sealant from the reservoir and connecting passages and the force of spring 55, the sealant entering groove 44 will immediately and automatically displace any line fluid or other foreign matter from groove 44 via duct 61, groove 60, passage 62, upper bridging recess 63, passage 59, groove 58, and passage 57 into the inner end of trap chamber 56, the force being exerted by the sealant on the trapped material causing trap piston 54 to be forced outwardly in sleeve 50 and compressing spring 57 (FIG. 2). The volume of trap chamber 56 will be made such as to have sufficient capacity to accommodate the line fluid and foreign matter which may be trapped in groove 44. Ordinarily, at closure of the gate, about one-third of the sealing groove will contain this foreign material, hence the volume of trap chamber 56 will usually need to be no greater than sufficient to accommodate about this proportion of the volumetric capacity of the sealing groove and its related passages.

By the evacuation of foreign material from the sealing groove displaced by the entering reservoir sealant, the sealing groove can thus be quickly and fully filled with sealant, thereby assuring a complete and continuous plastic seal between the downstream seat and the opposed face of the gate. The open rearward end of sleeve 50 in open communication with the downstream flowway, permits maximum pressure differential to be developed quickly across the trap piston 54 and thereby speeds the flow of sealant to the groove 44.

When the gate is then moved back to the open position (FIG. 1), vent passage 65 will be moved into communication with duct 61. At the same time, upper bridging recess 63 will be moved out of communication with passages 59 and 62 while lower bridging recess 64 will be moved to the bridging position. Upon equalization of the line pressure across the valve in response to the opening of the valve, spring 55 will be freed to exert its force against trap piston 54 and urge the latter toward passage 57, thereby displacing from trap chamber 50 the previously introduced line fluid and foreign matter and discharging the latter through passage 57, groove 58, passage 59, recess 64, passage 62, groove 60, duct 61 and vent passage 65 and thence into the interior of closure chamber 13, thereby clearing trap chamber 50 for a subsequent reception of material evacuated from the sealing groove upon the next closing of the valve.

As seen in FIG. 2, with the gate in the flowway-closing position, trap piston 54 is in the retracted position under the pressure of the evacuated material from the downstream sealing groove. Upstream trap chamber 50, however, will be under the same pressure as that on the upstream side of the valve, being in open communication with flowway 12 on opposite sides of piston 54 and the latter, therefore, will be in the advanced position under the force of spring 55.

With the valve in the fully open position, as seen in FIG. 1, both trap pistons 54 will be in their advanced positions since the pressure will be balanced across both of these pistons.

From the foregoing, it will be seen that this invention provides a novel arrangement for automatically and quickly exhausting line fluid and foreign matter from the sealing grooves in a valve of the general character herein described, in order to assure complete and very rapid filling of the sealing groove with plastic sealant upon closing of the valve, and which automatically reconditions the trap chamber for the reception of additional foreign matter upon re-opening of the valve. These are important considerations, particularly in large size, through-conduit gate valves of the type employed particularly in oil and gas pipe lines ranging up to 36 inches in diameter, for example.

Moreover, the valve construction in accordance with this invention, affords an exceptionally economical design especially for the large size valves to which the invention is particularly adapted. Large diameter oil and gas pipe line valves may weigh several tons and machining of the relatively enormous body castings is a difficult and expensive procedure. By placing substantially all of the sealant passages, venting passages, and trap elements in or on the replaceable seat members, substantially all of the machining operations will be confined to the relatively small members, thereby greatly reducing the difficulty and expense of constructing the large automatically sealed and automatically vented valves of the type herein contemplated.

It will be understood that various changes and modifications may be made in the details of the illustrative embodiment within the scope of the appended claims but without departing from the spirit of the invention.

What I claim and desire to secure by Letters Patent is:

1. An automatic plastic-sealed valve including a housing having a flowway therethrough, a closure member for the flowway movable between positions opening and closing the flowway, a seat in the flowway engageable by the closure member, a full-port sealant groove disposed about the flowway between the seat and the closure member, a sealant reservoir in the housing, passage means arranged to connect the reservoir to said groove in the flowway-closing position of said closure member, barrier means in the reservoir movable in response to fluid pressure differentials across the valve when the closure member is in the flowway-closing position to force sealant through said passage means into said groove, trap chamber means in the housing, and duct means operable in said flowway-closing position of the closure member to connect said chamber means to said groove to receive non-sealant material displaced from said groove by entry therein of said sealant.

2. An automatic plastic-sealed valve including a housing having a flowway therethrough, a closure member for the flowway movable between positions opening and closing the flowway, a seat in the flowway engageable by the closure member, a full-port sealant groove disposed about the flowway between the seat and the closure member, a sealant reservoir in the housing, passage means arranged to connect the reservoir to said groove in the flowway-closing position of said closure member, barrier means in the reservoir movable in response to fluid pressure differentials across the valve when the closure member is in the flowway-closing position to force sealant through said passage means into said groove, trap means including a chamber in the housing operably connected to said groove to receive non-sealant material displaced from said groove by entry therein of said sealant, said trap means including ejector means in the chamber operable upon movement of the closure member to the terminal flowway-opening position to expel previously-injected non-sealant material from said chamber.

3. An automatic plastic-sealed valve including a housing having a flowway therethrough, a closure member for the flowway movable between positions opening and closing the flowway, a seat in the flowway engageable by the closure member, a full-port sealant groove disposed about the flowway between the seat and the closure member, a sealant reservoir in the housing, passage means arranged to connect the reservoir to said groove in the flowway-closing position of said closure member, barrier means in the reservoir movable in response to fluid pressure differentials across the valve when the closure member is in the flowway-closing position to force sealant through said passage means into said groove, and trap means including a chamber in the housing operably connected to said groove to receive non-sealant material displaced from said groove by entry therein of said sealant, passage means communicating spaced points in said chamber respectively with said groove and said flowway when the closure member is in the terminal flowway-closing position, a barrier piston in the chamber movable between said points, and biasing means urging said barrier piston toward the passage means communicating with said groove.

4. An automatic plastic-sealed valve including a housing having a flowway therethrough, a closure member for the flowway movable between positions opening and closing the flowway, spaced seats in the flowway engageable by opposite faces of the closure member, a full-port sealant groove disposed about the flowway between each seat and the opposed face of the closure member, a pair of sealant reservoirs in the housing, passage means arranged to connect the reservoirs with the related sealing grooves in the flowway-closing position of said closure member, barrier means in each reservoir movable in response to fluid pressure differentials across the valve when the closure member is in the flowway-closing position to force sealant from the downstream reservoir through said passage means into the downstream groove, a pair of trap means each including a chamber in the housing, and duct means operable in said flowway-closing position of the closure member to connect a trap means to a related one of said grooves to receive non-sealant material displaced from said grooves by entry therein of said sealant.

5. An automatic plastic-sealed valve including a housing having a flowway therethrough, a closure member for the flowway movable between positions opening and closing the flowway, spaced seats in the flowway engageable by opposite faces of the closure member, a full-port sealant groove disposed about the flowway between each seat and the opposed face of the closure member, a pair of sealant reservoirs in the housing, passage means arranged to connect the reservoirs with the related sealing grooves in the flowway-closing position of said closure member, barrier means in each reservoir movable in response to fluid pressure differentials across the valve when the closure member is in the flowway-closing position to force sealant from the downstream reservoir through said passage means into the downstream groove, and trap means including a chamber in the housing operably connected to each of said grooves to receive non-sealant material displaced from said grooves by entry therein of said sealant, said trap means including ejector means in the chamber operable upon movement of the closure member to the terminal flowway-opening position to expel previously received non-sealant material from said chamber.

6. An automatic plastic-sealed valve including a housing having a flowway therethrough, a closure member for the flowway movable between positions opening and closing the flowway, spaced seats in the flowway engageable by opposite faces of the closure member, a full-port sealant groove disposed about the flowway between each seat and the opposed face of the closure member, a pair of sealant reservoirs in the housing, passage means arranged to connect the reservoirs with the related sealing grooves in the flowway-closing position of said closure member, barrier means in each reservoir movable in response to fluid pressure differentials across the valve when the closure member is in the flowway-closing position to force sealant from the downstream reservoir through said passage means into the downstream groove, and trap means including a pair of chambers in the housing operably connected respectively to each of said grooves to receive non-sealant material displaced from the said downstream groove by entry therein of said sealant, passage means communicating spaced points in each of said chambers respectively with said groove and said flowway when the closure member is in the terminal flowway-closing position, a barrier piston in each chamber movable between said points, and biasing means urging said barrier piston toward the passage means communicating with said groove.

7. An automatic plastic-sealed valve including a housing having a flowway therethrough, a closure member for the flowway movable between positions opening and closing the flowway, a seat in the flowway engageable by the closure member, a full-port sealant groove disposed about the flowway between the seat and the closure member, a sealant reservoir in the housing, passage means arranged to connect the reservoir to said groove in the flowway-closing position of said closure member, barrier means in the reservoir movable in response to fluid pressure differentials across the valve when the closure member is in the flowway-closing position to force sealant through said passage means into said groove, and trap means including a chamber in the housing operably connected to said groove to receive non-sealant material displaced from said groove by entry therein of said sealant, passage means communicating spaced points in said chamber respectively with said groove and said flowway when the closure member is in the terminal flowway-closing position, a barrier piston in the chamber movable between said points, and biasing means urging said barrier piston toward the passage means communicating with said groove; port means in the closure member having communication with the flowway and positioned to register with said last-mentioned passage means when the closure member is in the flowway-opening position.

8. In an automatic plastic-sealed valve, a housing having upstream and downstream flow ports defining a flowway through the valve, a through-conduit gate slidable across said flowway between positions opening and closing the same, a seat in the downstream flow port slidably engageable by said gate, an annular sealant groove disposed about the flowway between said seat and said gate, a sealant reservoir in the housing, passage means arranged to connect the reservoir to said groove in the flowway-closing position of said gate, the arrangement being such that as the gate moves toward the flowway-opening position a portion of said annular groove is exposed to line fluid wash and turbulence and thereafter as the gate is moved to the flowway-closing position said portion of said groove becomes at least partially filled with entrapped line fluid, means for quickly evacuating said entrapped line fluid comprising, a trap chamber in said housing, passage means connecting spaced points in said chamber respectively to said groove and to said downstream flow port when the gate is in the terminal flowway-closing position, a movable barrier in said chamber slidable between said points and biased toward the point communicating with said groove, whereby upon movement of the gate to the flowway-closing position said entrapped fluid will be quickly forced into said chamber by the dominant pressure existing in said reservoir over the downstream pressure.

References Cited by the Examiner

UNITED STATES PATENTS

| | | | |
|---|---|---|---|
| 2,332,282 | 10/1943 | Volpin | 137—246.12 |
| 2,360,599 | 10/1944 | Volpin | 137—246.12 X |
| 2,868,221 | 1/1959 | Eichenberg | 137—246.12 |
| 2,999,510 | 9/1961 | Volpin | 137—246.12 |

CLARENCE R. GORDON, *Primary Examiner.*